(12) United States Patent
Belcher

(10) Patent No.: US 6,639,718 B2
(45) Date of Patent: Oct. 28, 2003

(54) TELESCOPE MOUNT

(76) Inventor: Michael John Belcher, 9a Hobson Heights Road, Albany, Auckland (NZ)

( * ) Notice: Subject to any disclaimer, the term of this patent is extended or adjusted under 35 U.S.C. 154(b) by 79 days.

(21) Appl. No.: 09/837,999

(22) Filed: Apr. 19, 2001

(65) Prior Publication Data

US 2002/0154400 A1 Oct. 24, 2002

(51) Int. Cl.⁷ .............................................. G02B 23/00
(52) U.S. Cl. ....................... 359/430; 359/399; 359/405
(58) Field of Search ................................ 359/430, 405, 359/429

(56) References Cited

U.S. PATENT DOCUMENTS

| | | | | |
|---|---|---|---|---|
| 3,951,511 A | * | 4/1976 | Parsons ....................... | 359/430 |
| 4,400,066 A | * | 8/1983 | Byers ......................... | 359/430 |
| 4,539,485 A | * | 9/1985 | Neuenschwander .......... | 290/53 |
| 4,682,091 A | * | 7/1987 | Krewalk et al. ............ | 318/603 |
| 4,822,156 A | * | 4/1989 | Hugenell ..................... | 359/853 |
| 5,117,606 A | * | 6/1992 | Mikami ..................... | 52/738.1 |
| 5,303,932 A | * | 4/1994 | Kessler ....................... | 473/492 |

OTHER PUBLICATIONS

Hertel, A[Herti] et al, Title: Support for mounting of camera, telescope, lights, antenna, and suchlike has stabilizer inside it and interacts with shell and filling material to fix object being supported in any position. Derwent Info. Ltd., DE 20005216 U1.*

* cited by examiner

*Primary Examiner*—Thong Nguyen
*Assistant Examiner*—Arnel C. Lavarias
(74) *Attorney, Agent, or Firm*—Greer, Burns & Crain, Ltd.

(57) ABSTRACT

A support for a telescope includes cavities for holding ballast material for improved stability. The cavities are provided in a fork to which the telescope is mounted, the fork is fixed to a ground-engaging frame for rotation about an axis of the fork. The cavity includes a lowermost conical section having an axis aligned with the axis of rotation.

10 Claims, 8 Drawing Sheets

TELESCOPE MOUNT

TECHNICAL FIELD

The present invention relates generally to telescopes and in particular, to mounts for astronomical telescopes.

BACKGROUND ART

There are two basic types of telescope mounts: altazimuth and equatorial, both having two orthogonal axes of rotation. In the altazimuth mount, one axis (altitude) is horizontal and the other (azimuth) vertical. In the equatorial mount, a first (polar) axis is parallel to the earth's axis (made so by inclining it to the horizontal by an angle equal to the latitude of the viewer) and the second (declination) axis permits adjustment of the angle of inclination. The equatorial mount makes celestial tracking simple: the object is located, the declination axis fixed, and the optical instrument rotated about the polar axis in a direction opposite to, and at a rate equal to the rate of, the earth's rotation. This is known as driving the telescope in right ascension (so known for the path followed by the light receiving end of the instrument). Although tracking of a celestial object is more difficult with the altazimuth mount, a computer can readily handle the variable drive rates to co-ordinate the complex multiplanar motions, and telescopes with both altazimuth and equatorial mounts are often motor driven.

A fork mounting is used for both altazimuth and equatorial mounts, wherein the telescope is carried between bearings of an axis (altitude or declination) in a fork through which it is swung to gain access to the sky. An altazimuth mounting is a fork mounting with the axis vertical so that the tines have no transverse load. In the equatorial fork mounting, the polar axis is inclined, and the fork itself must be rigid to reduce the bending and twisting deflections of the tines.

Large Cassegrainian telescopes, are often preferred by astronomers and for serious amateur observation by individuals and societies. These telescopes typically have an aperture diameter of about 600 mm or more, with an equatorial or altazimuth fork mount and motor drive. Such telescopes have traditionally been of massive metal construction in order to attain the necessary stiffness to avoid problems associated with deflection. The support frames and foundations for these telescopes have also been correspondingly heavy making them very difficult to relocate.

Lightweight Newtonian telescopes can be readily lifted onto a car trailer and driven to a suitable viewing location. These lightweight instruments however, lack stability and are adversely affected by ground vibration, wind disturbance and operational vibration. As well as having drawbacks for ordinary viewing, this lack of stability reduces their capacity for use with sensitive auxiliary instrumentation, particularly when operating at higher magnifications.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a mount for supporting a telescope, wherein the mount includes means for containing ballast material.

The mount includes a pivotable frame mounted on a ground-supported frame. The ground-supported frame accommodates a pivotal movement in the pivotable frame, and the pivotable frame includes the ballast containers substantially symmetrically disposed about the axis of the frame.

Preferably, the pivotable frame comprises a fork having a pivot for rotation thereof about a first axis, being the axis of the fork, and the fork defines a second perpendicular axis for rotation of the telescope thereabout. The telescope is supported on bearings between two tines of the fork. Different ground-supported frames are provided to support the yoke in either equatorial or altazimuth alignment.

The ballast containers are liquid tight and adapted to contain flowable ballast material. The ballast allows the most desirable telescope mass to be obtained with any number of conventional or unconventional materials such as, wet or dry sand and or small stones, water, crushed ice and other fluids and semi-fluids and solids.

A conical ballast container is provided at one end of the fork. In the structural yoke joining the two tines of the fork is provided a substantially cylindrical ballast container. The conical container and the substantially cylindrical ballast container are separated by a drive wheel. The fork is supported on a bearing adjacent to the apex of the conical container and on rollers running on the drive wheel. The ballast containers and the wheel may be readily separated for portability.

Before the fork is assembled for use the ballast is loaded thorough closures in the hard shell of the containers.

The containers are made from high modulus lightweight composite materials. This mount, compared to the prior art, offers cost-competitive construction, together with rigidity and low thermal mass, while avoiding the need for massive foundations.

It has been found that the ballast works to improve the stability of the telescope mounting, by both favorably altering the harmonics of the mounting and reducing vibrations of the telescope. The ability to raise the mass of the telescope mount in-situ provides this improved stability by lowering the centre of gravity of the mount. The natural frequency of vibration of the stiff composite fork structure is relatively high, this natural frequency is advantageously lowered by the addition of mass. The presence of the flowable ballast material also serves to dampen vibrations in the mount, dissipating the energy within the ballast material. The high stiffness, lower natural frequency and dampening properties allow a pointing accuracy or tracking ability of the same order as the to be achieved. For example, a pointing and tracking accuracy of a few arcseconds may be readily achieved.

BRIEF DESCRIPTION OF DRAWINGS

Further aspects of the present invention will become apparent from the ensuing description which is given by way of example only and with reference to the accompanying drawings in which:

FIG. 3b is an elevation of the wheel of FIG. 3a;

FIG. 6b is a partial elevation of the frame of FIG. 6a;

BEST MODES FOR CARRYING OUT THE INVENTION

Figure 1:
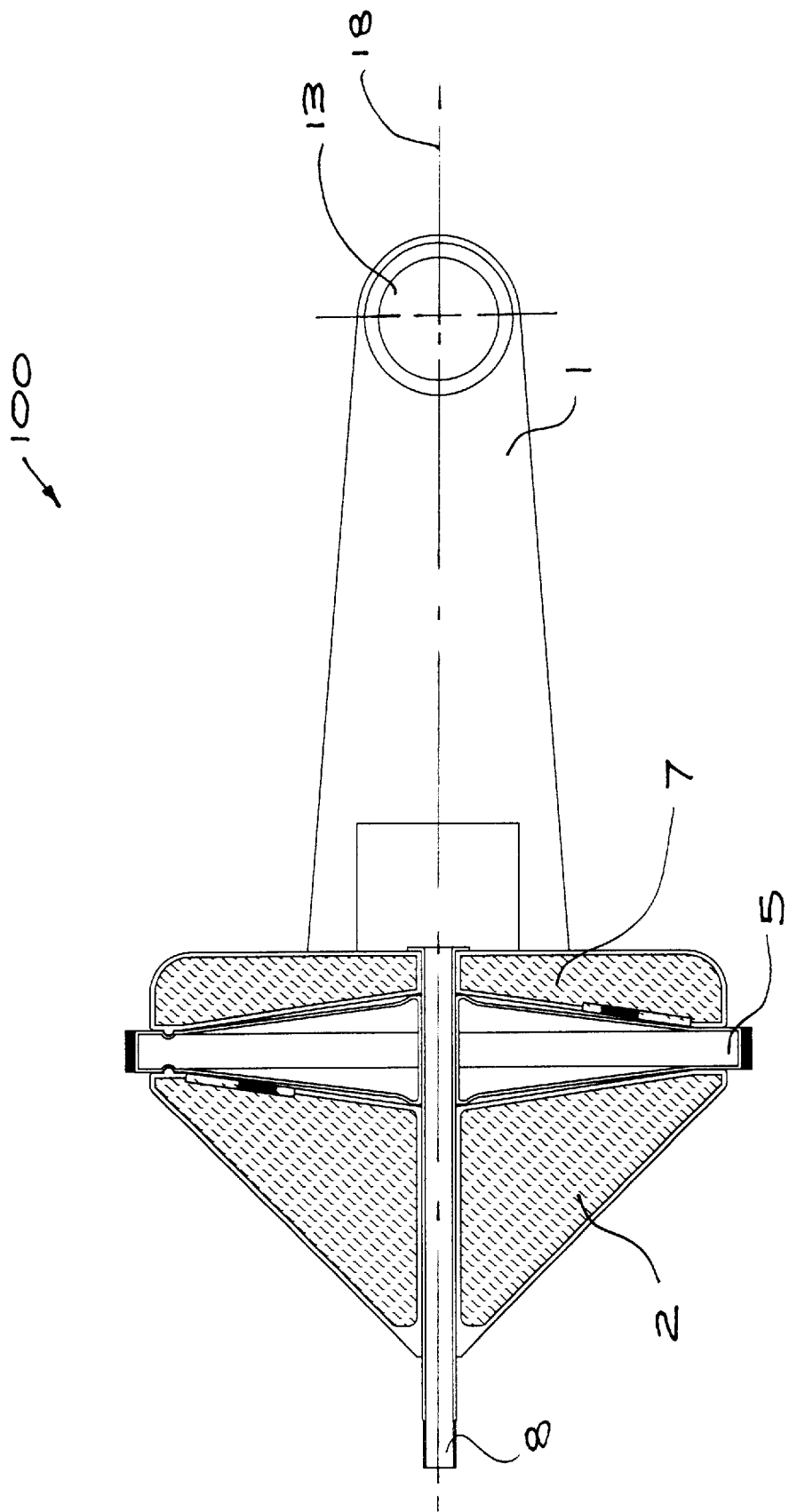
FIG. 1 is a sectional elevation of a fork mount of the present invention.
Figure 2:
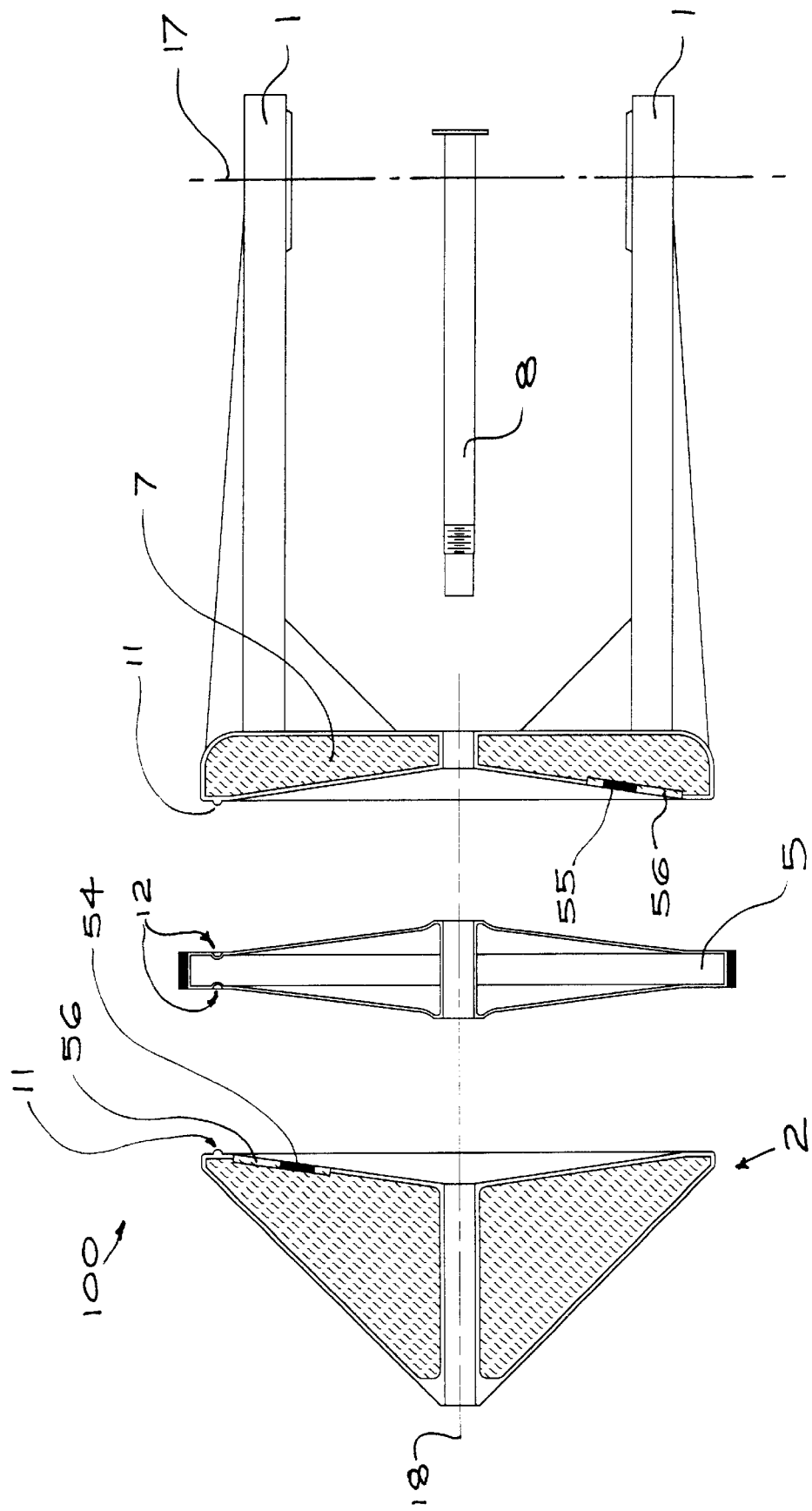
FIG. 2 is an exploded sectional plan of the fork mount of FIG. 1.

Referring to FIGS. 1 and 2, a fork mount 100 for a telescope is substantially symmetrical about axis 18 and includes two tines 1 connected by a hollow yoke 7 which is adapted to contain ballast material (indicated by the hatching on the drawing). The yoke 7 is fixed to one side of a drive wheel 5, the other side of which is fixed to a generally conical ballast container 2. Bearing apertures 13 are provided in the opposing tines 1 and define an axis 17, orthogonal to axis 18. Both the container 2 and yoke 7 are liquid tight and capable of holding any flowable ballast.

The container 2 and wheel 5 are adapted to be readily separable from the yoke 7. When separated (as shown in FIG. 2) ballast can be added or removed by means of closures 54, 55 in the container 2 and yoke 7 respectively. The closures 54, 55 are each formed in a membrane 56 to equalize atmospheric pressure between inside the vessel and the surrounding atmosphere. The container 2, wheel 5 and yoke 7 are clamped together by a threaded shaft 8 coaxial with axis 18. Relative rotation therebetween is prevented by means of tabs 11 on the container 2 and yoke 7, which engage with apertures 12 on the wheel 5. Both the conical container 2 and the yoke 7 have smooth surfaces on the inside to reduce agitation of the ballast during normal telescope operation, and are preferably formed with a carbon fiber and epoxy resin shell.

Preferably the ballast material is dry sand. Water may conveniently be used for ballast and other liquids or solids or a combination of liquids and solids generally can be used as ballast. Solids not in liquid suspension must be compacted and or held in place to prevent mixing during normal telescope operation. Solid materials, such as sand, can be mixed with lightweight solids such as table tennis balls or lumps of polystyrene or similar lightweight materials so that the specific gravity of the mixture is similar to that of water. Solid ballast must be of a suitable particle or grain size so that it can be evenly distributed inside the vessels to prevent torque about the axis 18 due to imbalance. If the telescope was to operate in temperatures below zero degrees Celsius, compacted crushed ice could also be used however it is not recommended that water be allowed to freeze into ice inside the vessels to avoid the build up of excessive stresses due to expansion. It is therefore recommended that the telescope and ice be kept below zero degrees Celsius while the ballast is in place.

Figure 3B:
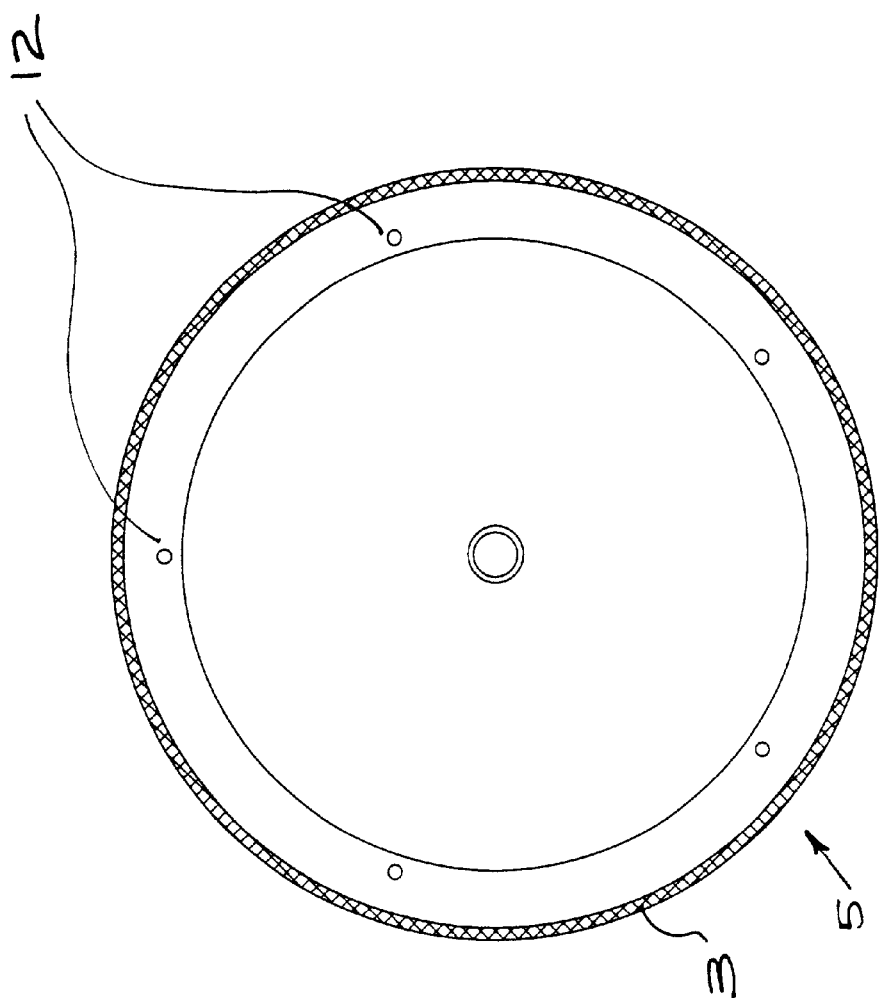
Figure 3A:
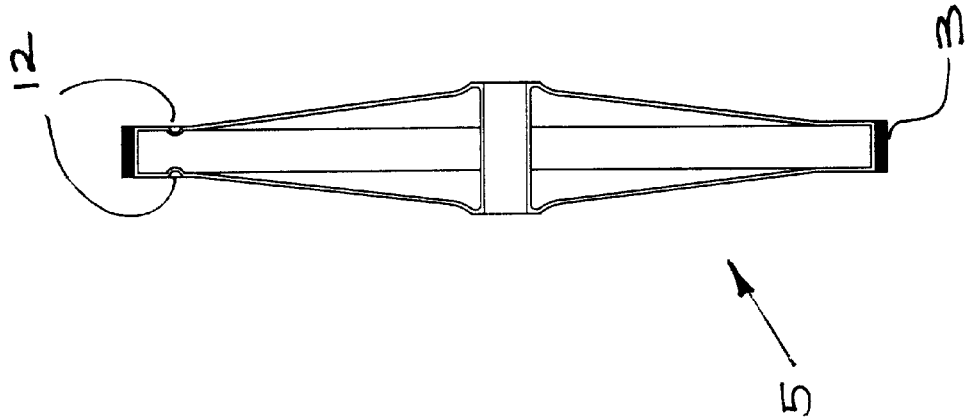
FIG. 3a is a section of a wheel of fork mount of the present invention.

Referring to FIG. 3, the wheel 5 has a steel tire 3 on which the fork 100 is supported for rotation about axis 18 (as will be described below).

Figure 4:
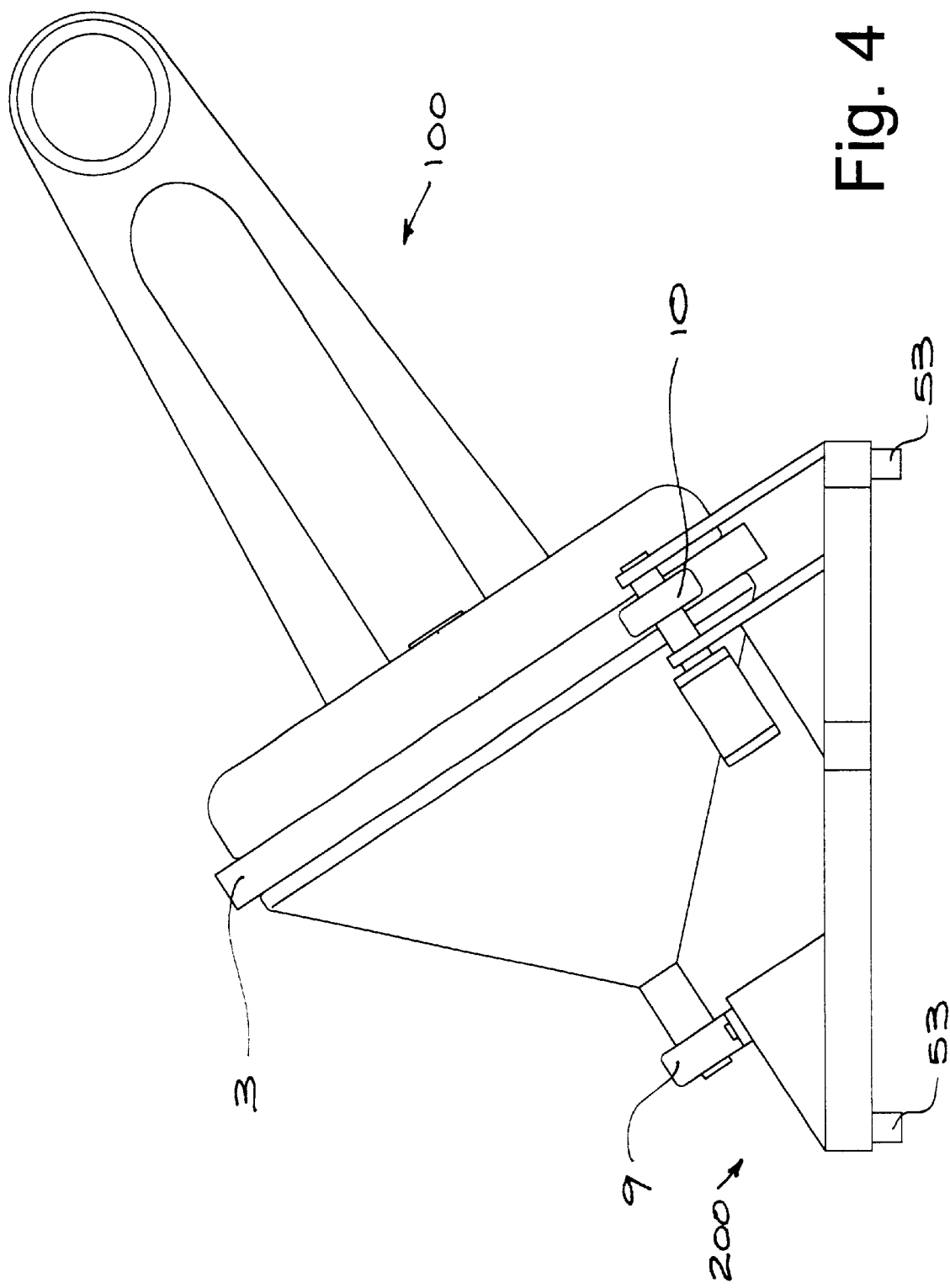
FIG. 4 is an elevation of the fork mount of FIG. 1 mounted in an equatorial frame.
Figure 5:
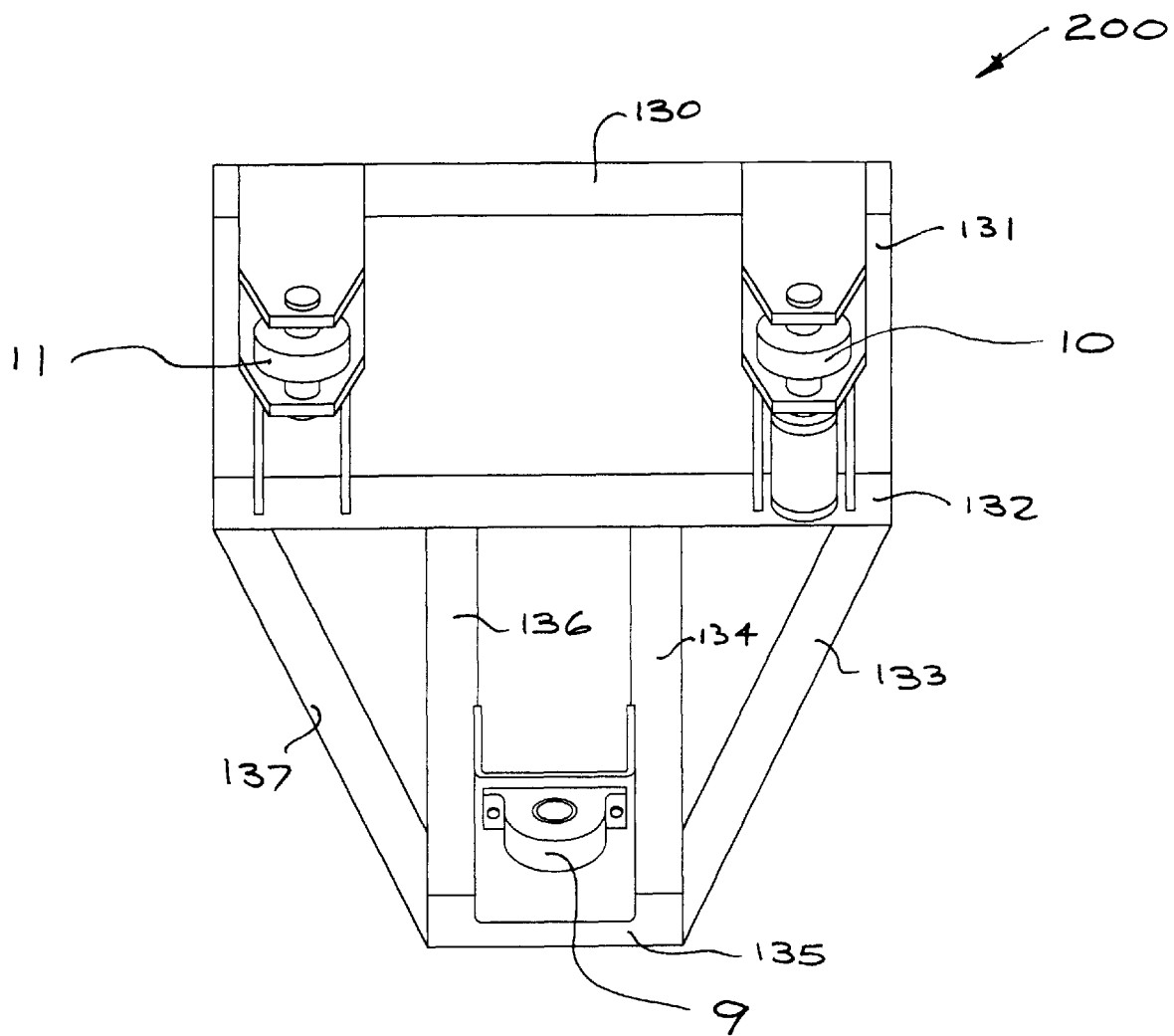
FIG. 5 is a plan of the equatorial frame of FIG. 4.

FIGS. 4 and 5 illustrate a ground engaging equatorial mounting frame 200 for supporting the fork 100 (with its axis 18 inclined) on the ground on three adjustable feet 53. The frame 200 includes structural members 130–137 which provide fixtures for a bearing 9, a free roller support 11 (see FIG. 5) and a driven roller support 10. The bearing 9 engages with the axle 8 (see FIGS. 1 and 2) and both roller supports engage with the tire 3 (also see FIGS. 1 and 2). Preferably the frame 200 is of one-piece welded construction.

While the telescope is able to properly function without ballast, in this configuration the addition of ballast acts to favorably increase the friction load on the drive system, particularly for such a mounting frame 200 used at lower latitudes. For use at higher latitudes the frame 200 may be adapted by the addition of a jockey wheel (not shown) engaging with the uppermost edge of the tire 3

Figure 6A:
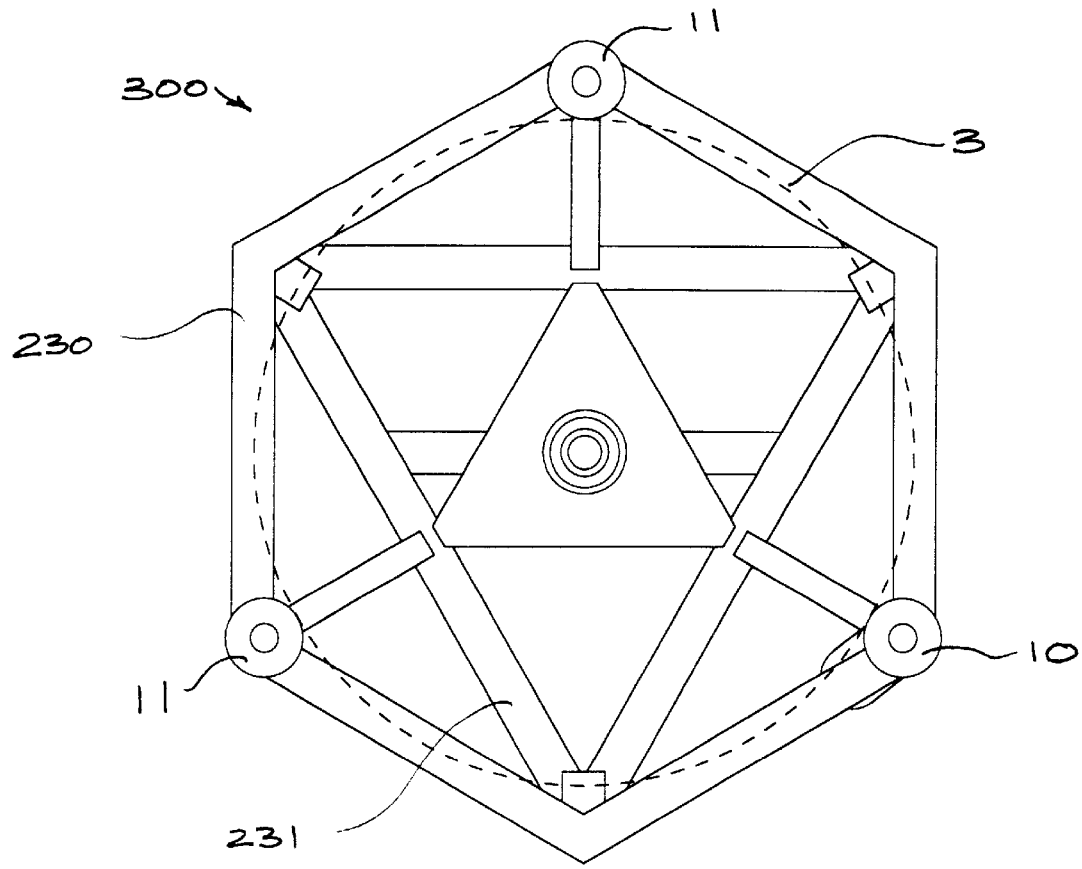
FIG. 6a is a plan of an altazimuth frame for a fork mount of the present invention.
Figure 6B:
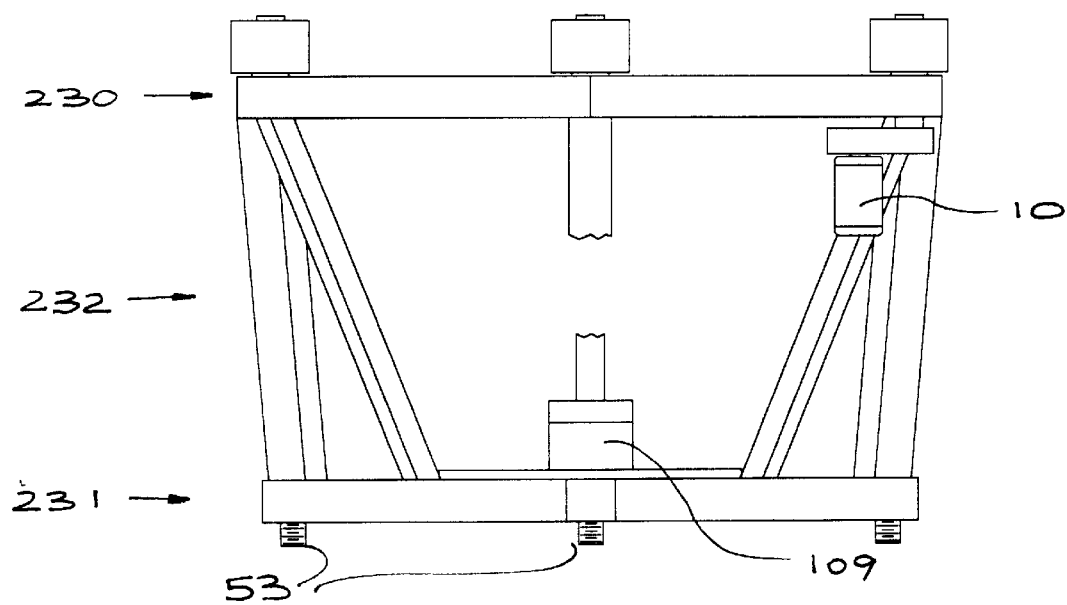
Figure 7:
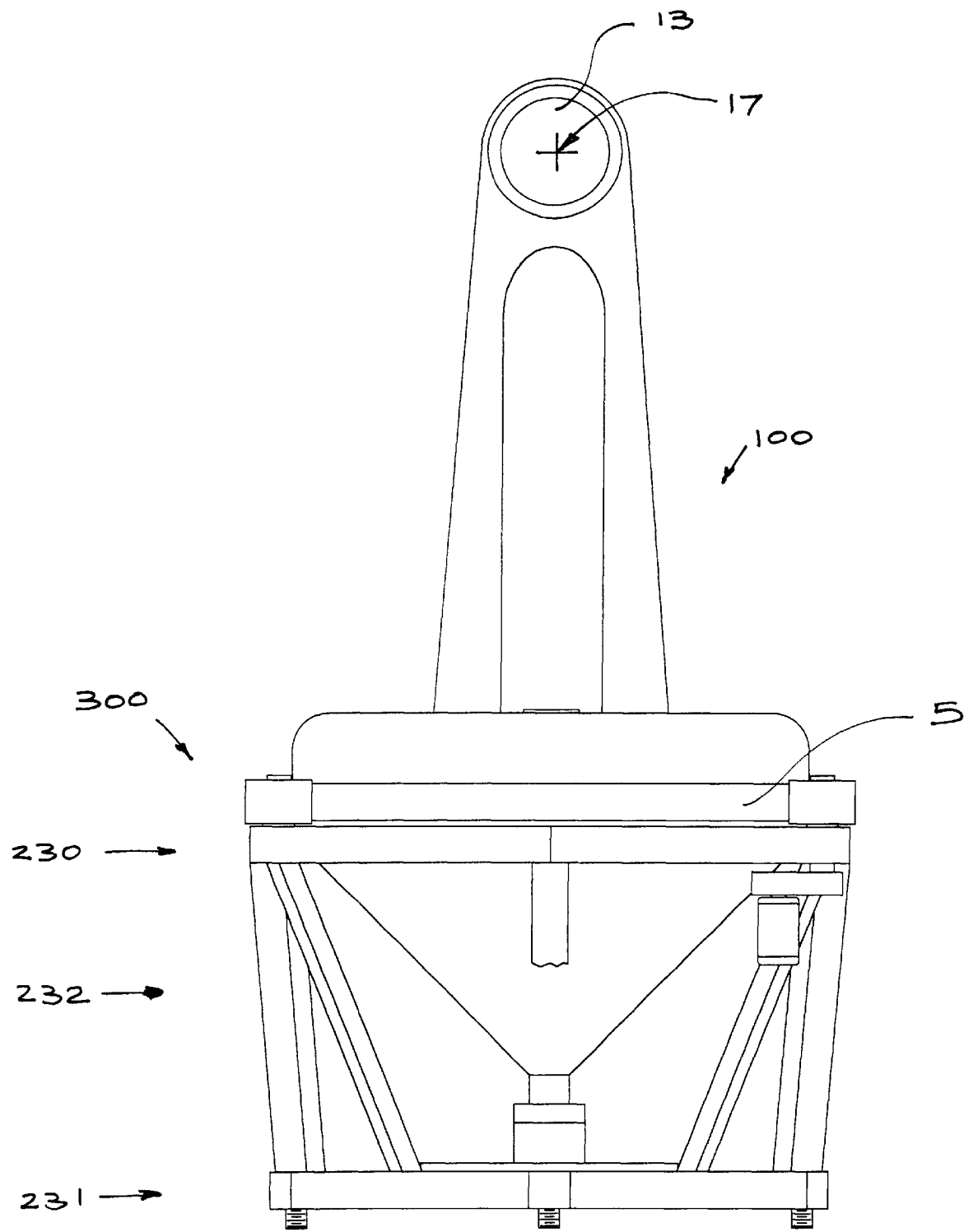
FIG. 7 is an elevation of the frame of FIG. 6b with a fork mount of the present invention.

FIGS. 6a, 6b and 7 illustrate a ground engaging altazimuth mounting frame 300 for supporting the fork 100 (with its axis 18 vertical) on three height adjustable legs 53. The frame 300 comprises structural elements 230–232 joined to provide fixtures for a bearing 109, two jockey rollers support 11 and a driven roller supports 10 for engagement with the tire 3. Preferably the frame 300 is of one-piece welded construction. The weight of the fork 100 is supported on the bearing 109 and the fork 100 is fixed laterally in position by means of the driven roller 10 which is tensioned against the fixed jockey rollers 11.

Reference will now be made to describing the telescope operation using terminology relating to the altazimuth mounting, it will be appreciated by those skilled in the art that the arrangement described, however, is also applicable for use with the equatorial mounting, as already described.

Figure 8:
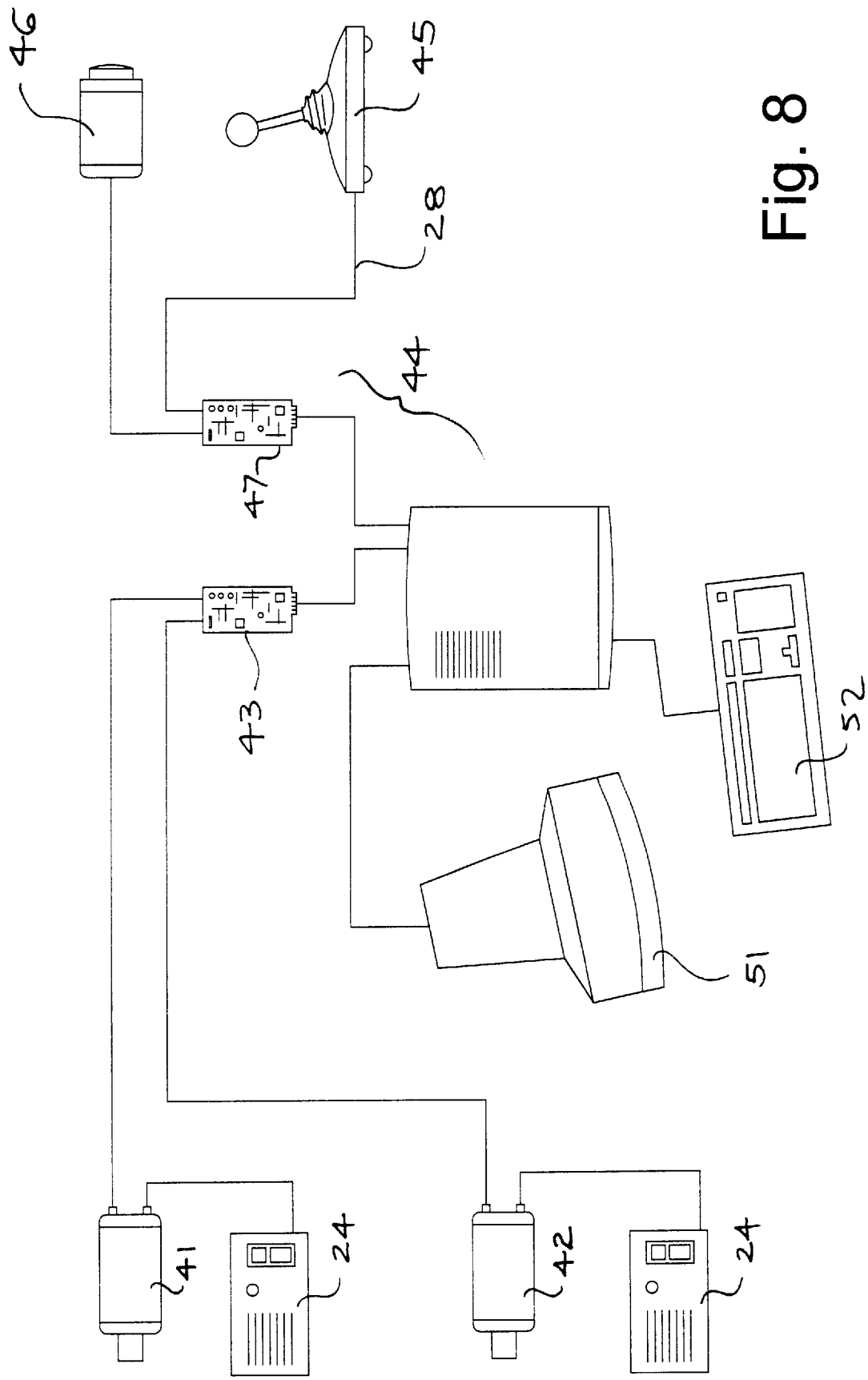
FIG. 8 is a schematic diagram of device for controlling a telescope.

Referring now to FIGS. 7 and 8, a transportable reflecting telescope (not shown), preferably of the Cassegrainian type with a 600 mm aperture diameter may be mounted in the bearing apertures 13 in the tines 1 for rotation about the altitude axis 17. Orientation of the telescope around the sky is achieved by stepper motors 41, 42 operating a friction drive on the azimuth axis wheel 5 and the altitude axis wheel respectively (not shown).

The telescope is controlled by drive software installed in a personal computer 44, having a monitor 51 and keyboard 52. The stepper motors 41, 42 are powered from power supply 24 and controlled by a computer card 43 fitted into the computer 44. A joystick 45 is connected to the computer 44 via a serial link 28 which gives manual override.

A charge-coupled device camera 46 mounted on the telescope and aimed at the same target or a near star sends input to a controller card 47 installed into the computer 44. The camera 46 in conjunction with the drive software performs the function of a servo telescope to the main instrument by providing target maintenance.

Once a desired object has been entered into the drive system the software instructs the instrument to slew from the present target to the new target position and stay on target.

The photometric and photographic usefulness of the telescope depends largely on its pointing ability and an accuracy of 20 arc seconds RMS is achieved with this instrument. This is assisted by providing a relatively large diameter wheel 5 with a small runout, reducing inaccuracies caused by backlash in the drive for the roller supports 10.

Aspects of the present invention have been described by way of example only and it should be appreciated that modifications and additions may be made thereto without departing from the scope thereof as defined in the appended claims.

What is claimed is:

1. A stability improving mount for a telescope, the mount including:
    a ground-supported frame;
    a fork with two tines for supporting the telescope therebetween, the fork being pivotably mounted on the ground-supported frame for rotation about a first axis, and at least one hollow container for holding flowable ballast material, each container being fixed to the fork and substantially symmetrically disposed about the first axis.

2. The mount of claim 1, wherein the at least one ballast container includes a conical ballast container.

3. The mount of claim 2 wherein the at least one ballast container includes:
   a substantially cylindrical ballast container, the mount further including
      a drive wheel on which the fork is supported for rotation about the first axis, the drive wheel being secured to the cylindrical and conical ballast containers for common rotation.

4. The mount of claim 3 wherein the cylindrical ballast container is integrally formed with the tines, the tines extending symmetrically about the first axis, the fork further including a shaft coaxial with the first axis that extends through and releasably connects the cylindrical ballast container, the drive wheel and the conical ballast container.

5. The mount of claim 4 wherein the conical container, the drive wheel and the cylindrical container are formed from composite materials.

6. In a stability improving equatorial or altazimuth mount for a telescope, the mount having a ground-supported frame and providing for rotation of the telescope about first and second mutually perpendicular axes, a fork pivotably fixable to the ground-supported frame, the fork including:
   two elongate tines for supporting the telescope for rotation therebetween about the second axis, the tines extending substantially symmetrically about the first axis;
   a conical ballast container substantially symmetrically disposed about the first axis;
   a substantially cylindrical ballast container integrally formed with the tines and substantially symmetrically disposed about the first axis, both containers having substantially rigid shells adapted for holding flowable ballast material;
   pivoting mounting means for connecting the fork to the ground-supported frame for rotation about the first axis, the mounting means including a bearing fixed adjacent to the apex of the conical ballast container and a drive wheel secured to the cylindrical and conical ballast containers for common rotation; and
   a shaft coaxial with the first axis that extends through and releasably connects the cylindrical ballast container, the drive wheel and the conical ballast container.

7. A stability improving mount for supporting a telescope, the mount including:
   a ground-supported frame;
   a pivotable frame for supporting the telescope, the pivotable frame being pivotably mounted on the ground-supported frame for rotation about a first axis, and
   a conical ballast container and a substantially cylindrical ballast container for holding flowable ballast material, each container being fixed to the pivotable frame, the mount further including
      a drive wheel on which a fork is supported for rotation about the first axis, the drive wheel being secured to the cylindrical and conical ballast containers for common rotation.

8. The mount of claim 7 wherein each ballast container is liquid tight, having a substantially rigid shell with an opening therein and a closure for sealing the opening.

9. The mount of claim 7 wherein the addition of ballast to a ballast container lowers the center of gravity of the fork.

10. The mount of claim 7 wherein each ballast container holds ballast material in the form of solid particles or solid particles in liquid suspension.

* * * * *